United States Patent [19]
Lehe

[11] 3,757,743
[45] Sept. 11, 1973

[54] SLATTED FLOORING CONNECTOR SYSTEM

[75] Inventor: Russell B. Lehe, Cleveland, Ohio

[73] Assignee: Morandex, Inc., Cleveland, Ohio

[22] Filed: Jan. 20, 1972

[21] Appl. No.: 219,312

[52] U.S. Cl............................ 119/28, 52/586, 52/588
[51] Int. Cl................................................. A01k 1/00
[58] Field of Search .................. 119/20, 28; 52/586, 52/588

[56] References Cited
UNITED STATES PATENTS

| | | | |
|---|---|---|---|
| 3,680,530 | 8/1972 | Drawsky | 52/588 X |
| 3,348,459 | 10/1967 | Harvey | 52/586 X |
| 3,269,072 | 8/1966 | Black | 52/588 X |
| 2,181,812 | 11/1939 | Kammerer | 52/586 X |
| 1,096,944 | 5/1914 | Phillips | 52/588 X |
| 2,164,681 | 7/1939 | Fould | 52/588 X |
| 3,043,407 | 7/1962 | Marryatt | 52/588 |

*Primary Examiner*—Russell R. Kinsey
*Assistant Examiner*—J. N. Eskovitz
*Attorney*—James H. Tilberry et al.

[57] ABSTRACT

A lightweight, easily-assembled slatted flooring system for an animal enclosure comprising a plurality of channels interconnected in spaced-parallel relationship by X-shaped connectors, each connector having arcuately-shaped ends extending from two of its legs which engage similarly shaped grooves in the upper, outer corners of each channel.

15 Claims, 3 Drawing Figures

SLATTED FLOORING CONNECTOR SYSTEM

This invention pertains to a slatted flooring system and more particularly to the devices connecting the slats together.

The invention is particularly applicable to slatted flooring used in raising farm animals in a confined area and will be described with particular reference thereto, although it will be appreciated that the invention can be used for any slatted floor arrangement wherein a permanent, easily assembled, smooth, slatted flooring is desired.

It has long been recognized that the key to profitable production of farm animals raised in confinement in sanitation. Clean environments have heretofore been provided by erecting an enclosure having slatted flooring over a central portion thereof and a pit usually filled with water underneath the flooring through which waste matter can be washed away.

Such flooring has typically been constructed of wood which has proven undesirable for a number of reasons. Wood becomes slippery when wet or when impregnated with waste. It is expensive to construct, difficult to maintain and lasts a relatively short time. Some animals, particularly swine, have been known to chew through wooden slats. Other types of flooring have been similarly afflicted with inherent disadvantages. Steel floors encounter severe corrosion problems. Concrete slats are expensive to manufacture, costly to transport and often chip, sometimes cracking, thereby resulting in slat failure.

These problems have been recognized and at least partially overcome by some installations which provided a flooring comprising extruded aluminum channels arranged in spaced-parallel relationship. However, the channels have heretofore been interconnected and assembled by means which are either time consuming and/or lack sufficient rigidity to support or brace the channels from sidewall deflection thereby requiring the use of a stronger channel section than that actually necessary.

One such arrangement used a U-shaped connector having V-shaped ends to interconnect the channels with the U-shaped portion of the connector fitting on top of a channel and the V-shaped ends interlocking the adjoining channels' sidewalls. In addition to these connectors, the arrangement also used spacer clips fastened by nail to supporting joists from the top of the channels. While such an arrangement rigidly secured the slats together, the connectors and spacer clips themselves being on top of the slats were obstructions to what was otherwise a smooth flooring surface. Also there was difficulty in assembling the flooring in that each channel while having loose connectors resting thereon had to be juggled into interlocking position and secured by nailing to joists.

Another arrangement used a connecting bar extending the width of the flooring to connect and space the channels by attaching the same to the underside of the channels. However, the bar afforded no structural support for the channel, permitting the sidewalls to flex under load. In addition, a tool was needed to spread the channels' sidewalls to fit over the connector bar, which operation had to be done while working underneath the flooring system in the pit. Furthermore, difficulty was encountered in assembling a relatively large number of slats to a single connector bar in that the bar had to be held horizontally while the slats' sidewalls were spread to engage the channel's underside with the connector prongs. Because there was a limit to the resiliency of the channel's sidewalls, each successive channel to be assembled to the connector bar had to be jostled into position while holding the sidewalls spread out.

The present invention contemplates a connector which allows the flooring to be assembled faster and more efficiently than those systems previously described while also providing a load-carrying connection which rigidizes the assembled flooring.

In accordance with the present invention, there is provided a plurality of channels assembled and held in spaced-parallel relationship by connectors. Each channel has a shaped groove formed in each of its upper, outer corners. Each connector has similarly-shaped ends extending therefrom. These ends fit into and interlock with the channel grooves thereby joining together two adjacent channels.

The body of the connector extends outwardly and downwardly to contact the sidewalls when the flooring is assembled and brace the sidewall against deflection.

In the preferred embodiment, the connector is X-shaped and a rigid connection is assured by providing a deformable projection in the channel groove which is flattened by the tongue-shaped ends of the connector when the flooring is assembled.

To assemble, the connectors are hand inserted in one groove of a channel until contacting the deformable projection therein. The adjacent channel is then held in an inverted position and moved until its channel groove fits over the free connector tongue end. The adjacent channel is then rotated downwardly into its assembled position and in so doing the deformable projections in both grooves are crushed by the connector tongues thereby providing a rigid, interlocking connection.

The principal object of the invention is to provide a lightweight slatted flooring system which is easily assembled.

Another object of the invention is to provide a connection for slatted flooring system which braces the slats against deflection.

A further object of the invention is to provide a slatted flooring system with slats rigidly interconnected.

A further object of the invention is to provide an improved slatted flooring system and method of constructing the same which is both simple and economical.

The invention may take physical form in certain parts and arrangements of parts a preferred embodiment of which will be described in detail herein and illustrated in the accompanying drawings which form a part hereof and wherein.

Figure 1:
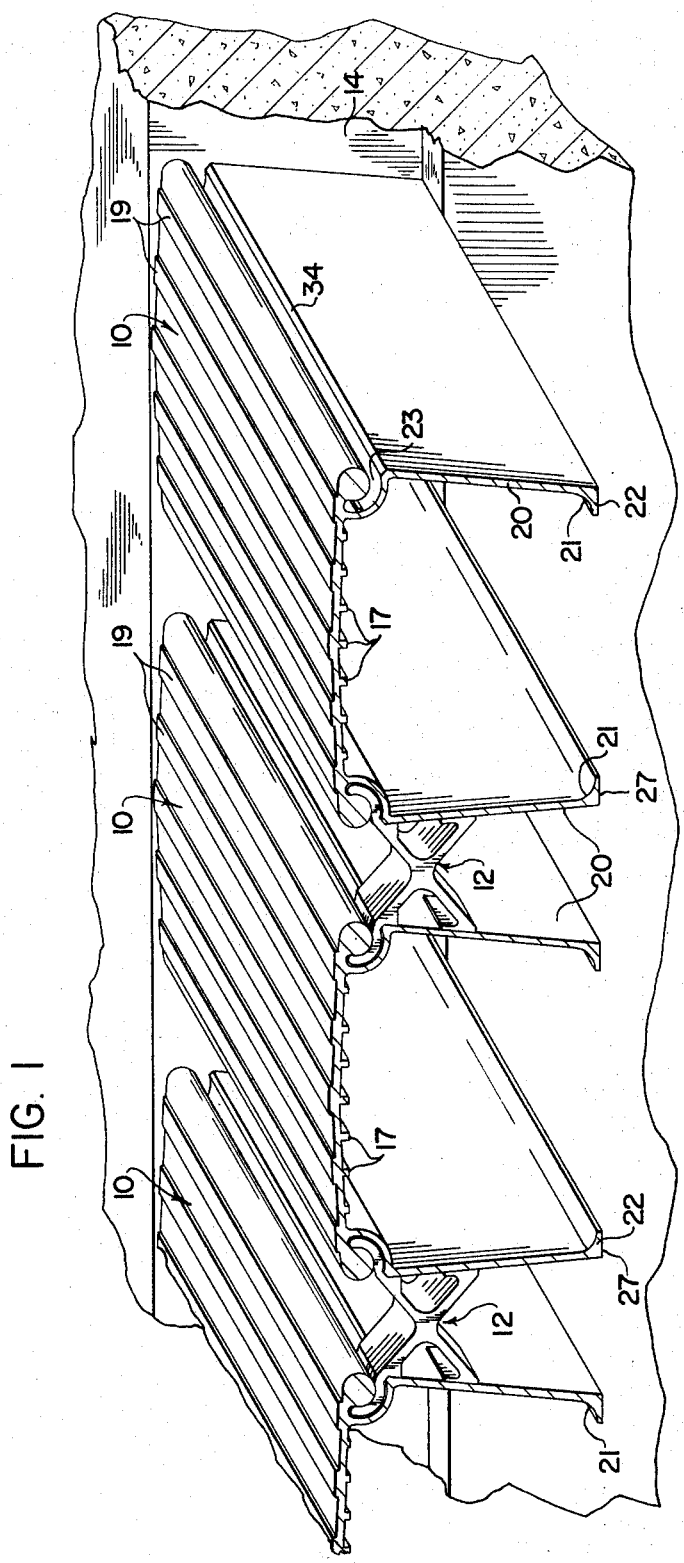
FIG. 1 is a perspective view of the assembled flooring.

Referring now to the drawings wherein the showings are for the purpose of illustrating a preferred embodiment of the invention only and not for the purpose of limiting same, FIG. 1 illustrates the general arrangement of the slatted flooring construction. The flooring comprises a plurality of longitudinally extending, inverted U-shaped channels 10. Connectors 12 interlock the channels 10 in spaced-parallel relationship. The flooring is supported by the end walls 14 of a pit which the flooring covers.

Not shown because unnecessary to the desription of the invention is the farm animal enclosure. Such enclosure generally comprises a frame structure having a concrete floor adjacent the slatted flooring. Usually the slatted flooring is in the center of the enclosure with the concrete floor or slabs on both sides of the slatted flooring enclined vertically-upwardly therefrom. Another typical enclosure utilizes a concrete center section, generally V shaped, with two slatted floors extending vertically-downwardly from both ends of the center section. Either arrangement permits easy maintenance because the refuse can be washed from the concrete pad or pads through the slatted flooring to the pit below.

Of course, the slatted flooring can comprise the complete floor of the enclosure. Such construction requires relatively long channel members and channel supports in the form of joists or a center wall to prevent the channel member from deflecting vertically downward under the weight of the animals.

Figures 2, 3:
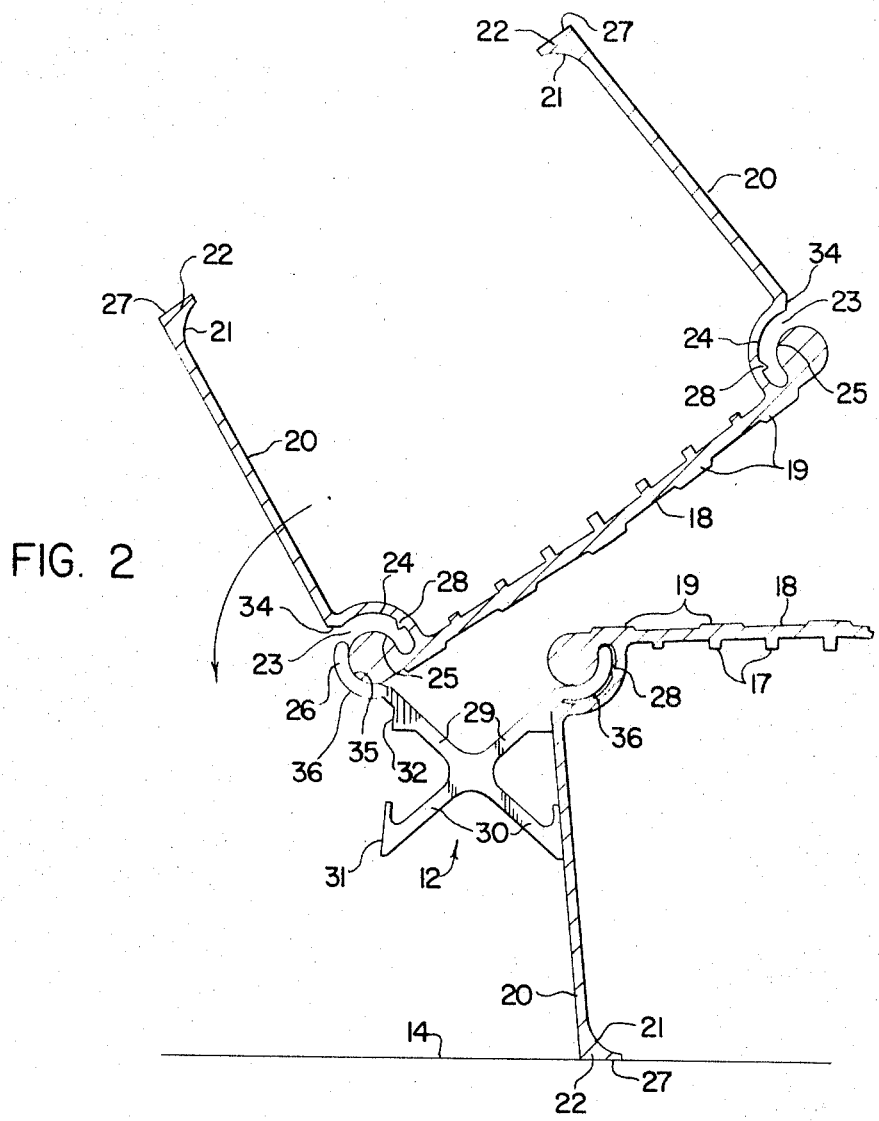
FIG. 2 is a cross-sectional elevational view of the channel and connector in accordance with the invention; and, FIG. 3 is an enlarged fragmentary view of FIG. 2, showing the joint between the connector and channel.

As is thus shown in the cross-sectional view of the channel in FIG. 2, each channel 10 is in the shape of an inverted U having a base 18, defining a load carrying surface and a pair of sidewalls 20. The base can be flat although in the preferred embodiment it is slightly crowned with a plurality of longitudinally-extending ribs 17, 19 on the lower and upper surfaces respectively. Ribbing and crowning the base 18 increases its rigidity thereby allowing the channel to be constructed of a thinner cross-sectional area than would otherwise be required.

The channel sidewalls 20 taper inwardly at an angle of about 5° to facilitate the flowing of waste matter between the channels to the pit below. Other angles may be employed. Extending inwardly from the bottom of each sidewall 20 is a support flange 22 having a flat bottom surface 27. The flanges should be long enough and the surfaces 27 are in a common plane such as to provide a stable support for each channel thereby preventing any tendency of the channel to rock or roll under load. The flanges are shown as filleted 21 to the sidewall thereby strengthening the sidewall and flange joint.

Formed at the outer juncture of each sidewall 20 with the base 18 is a groove 23 extending the entire length of the channel 18 although it is not necessary in accordance with the teachings of the invention to so extend the groove. The groove 23 is formed by a lower wall surface 24 and an upper wall surface 25 and curves upwardly toward the center plane of the channel.

Extending from at least one of the walls 24, 25 in the groove 23 is a deformable projection or interference-lock rib 28.

A chamfer 34 is formed at the outer juncture of the lower wall surface 24 and the sidewall 20.

In the preferred embodiment the upper 25 and lower 24 wall surfaces are arcuate being defined respectively by radii, R–1 and R–4 which are struck from the same center. It should be appreciated that the invention as disclosed herein is not limited to the shape of the groove as so described, but such groove can assume a wide variety of configurations for reasons which will hereafter be apparent.

The connector 12, can assume a wide variety of cross-sectional configurations such as trapezoidal, rectangular, I-beam, etc. However, in the preferred embodiment the connector 12 is X-shaped in cross section and comprises a pair of oppositely flaring upper legs 29 and a pair of oppositely flaring lower legs 30. Extending from each upper leg is an arcuate end 26 which fits into the groove 23, when the slatted flooring is assembled. The upper ends 26 have arcuate upper 35 and lower surfaces 36 defined by radii R–2 and R–4, respectively, which have the same common center as groove radii R–1 and R–3.

A relief, 32, is provided on the lower side of each upper leg 29 of the connector 12. This relief 32 corresponds in shape to the chamfer 34 on sidewall surface 24 of the channel member and abuts thereagainst when the flooring is assembled. The relief 32 provides both a positive stop for travel of the upper end 26 into the groove and a bracing support for sidewall deflection.

The bottom legs 30 of the connector have generally flat ends 31 which engage the side walls 20 generally midway of their width when the flooring is assembled. The spacing between channels is therefore a direct function of the distance between the flat ends 31 being increased or decreased as the distance between ends 31 increases or decreases respectively. Furthermore, a line drawn through the relief 32 and the end 31 of the connector 12 has a slope identical to the slope of the channel sidewalls 20, i.e. 5°.

Ends 31 are shown as flared and contact the channel sidewalls 20 approximately midway their width because it is at this point where side wall deflection will be the greatest.

When the flooring is assembled a clearance 37 exists between the groove's lower wall surface 25 and lower connector surface 36. In the preferred embodiment this clearance is taken up by projection 28 in the groove which initially was triangular in shape, having a height at least equal to and preferably greater than the clearance 37. Projection 28 is deformed by the upper connector end 26 when assembly takes place and a rigid joint connection interlocking adjacent channel members 10, is assured. The projection 28 is shown or located beyond the midway point of the groove to insure that the connector end is firmly in the groove 23 before meeting resistance of the projection 28.

It should also be appreciated that the projection 28 could be designed to break away from the wall when contacted by the connector end. The projection would then wedge itself between connector surface 36 and groove wall 28, taking up the clearance therebetween 37 and assuring a rigid joint.

Structurally, once the flooring is assembled, a rigid X brace defined by the connector relief 32 and connector end wall 31 prevents movement between adjacent channels. The connector upper ends 26 in conjunction with grooves 23 provide means for assembling the flooring system and once assembled serve further to stablize the channels against any rock or rolling motion imparted thereto. The projection 28 extending into the groove further rigidizes the entire connection between adjoining channels effectively stopping any movement of the channels resulting from small or slight deflections thereof and also preventing the connector from walking or sliding down the length of the channel. Hence, adjacent channels 10 are securely interlocked together.

The flooring system is assembled by placing one of the channels 10 over the pit supports 14 in an upright position; inserting the arcuate ends 26 of several connectors 12 into spaced points on the grooves 23 of the channel; positioning another channel 10 in an inverted relationship on top of the first channel; moving the inverted channel 10 laterally until its groove 23 contacts the arcuate free ends 26 of the connectors and then rotating the inverted channel 10 into an upright position thereby seating the arcuate ends 26 into grooves 23 and crushing the projections 28.

The rotation of the channel groove 23 into the arcuate connector end 26 is assured because the radius R-1 of the upper wall 25, is the same as the radius R-2 of the upper surface 35 of the connector 12. Therefore, a good ball and socket joint is assured by the rotation of wall surface 25 on the surface 35.

It is therefore apparent that a wide variety of modifications may be made to the lower wall 24 of the groove and/or the lower surface of the connector, 36. These modifications may be made, for example, if it is desired to more readily insure the starting of the connector end 26 into the channel groove 23 for applications requiring relatively long channel lengths which might prove difficult to rotate. For example, the wall surface 25 could be moved inwardly by merely shifting the center of radius R-1 inward thereby leaving the side wall chamfer 34 jutting out further to engage the tip of the connector end 26. Conversely, the sidewall 20 could be also modified to have its chamber 34 extend further laterally. Also, the radius R-4 defining the bottom channel groove wall 24 could be eliminated and replaced by a series of somewhat larger radii blending into a radius of R-2 length at the inner extremity of the groove. The opening of the groove could also be flared with a straight surface blending into a curved surface. Some of these modifications may also be incorporated on the lower wall surface 36 of the connector 12. These modifications could be incorporated into the connector 12 either in conjunction with the modifications to the channel groove 23 or independently of the modifications of the channel groove.

Further modifications to the groove and connector end will become apparent to those skilled in the art. For example, the arcuate grooves 26 and connector ends 26 illustrated could be replaced by grooves and connector ends having straight parallel wall surfaces which could either be inclined vertically-upwardly or the walls could be straight and come to a point so as to be V-shaped. As so modified, the channels would not be rotated into position, but simply dropped vertically downward into or moved laterally inward to engage the free connectors' ends. In each instance, a crushable projection extending from a wall in the groove would insure a rigid connection interlocking the channels together.

It is the essence of the invention therefore to construct a slatted flooring system having channels of a shape to incorporate therein a grove to be used in conjunction with a connector which allows the channels to be assembled and rigidly interlocked together.

Having thus described my invention, I claim:

1. A floor construction including a plurality of inverted elongated channel members each having a generally U-shaped cross-sectional configuration, said channel members extending substantially parallel to one another in spaced-apart relationship, each of said channel members including a base defining a load carrying surface and having spaced-apart opposite base edges, each of said channel members including a pair of spaced-apart sidewalls extending downwardly from said base adjacent said edges thereof and forming juncture areas with said base, each said channel member including a longitudinally extending groove adjacent each of said juncture areas, a plurality of connectors positioned between each pair of said channel members and having upper connecting portions locked in said grooves for interconnecting said channels, said connectors including spaced-apart downwardly extending portions abutting said outer surfaces of said sidewalls on adjacent ones of said channel members in areas spaced a substantial distance downwardly from said grooves.

2. The floor construction of claim 1 wherein said downwardly extending portions of said connectors have flat abutting surfaces contacting said outer surfaces of said sidewalls.

3. The floor construction of claim 1 wherein said grooves are arcuate in cross-sectional shape, said grooves opening outwardly substantially perpendicular to said sidewalls in locations spaced downwardly from said base edges and curving upwardly toward said base, said upper connecting portions being curved to correspond with said grooves.

4. The floor construction of claim 3 wherein said arcuate grooves are defined by spaced-apart upper and lower arcuate walls, said walls having facing upper and lower wall surfaces lying on the surfaces of circles having different radii and a common center.

5. The floor construction of claim 4 wherein said connecting portions of said connectors have upper and lower leg surfaces, said upper leg surface and said upper groove surface being arcuately curved at a substantially common radius having a substantially common center.

6. The floor construction of claim 3 wherein said grooves have inner connection surfaces and said upper connecting portions of said connectors have connection surfaces, at least one of said connection surfaces having a deformable projection thereon extending outwardly therefrom for locking one of said upper connecting portions in one of said grooves, said grooves and connecting portions having terminal ends and beginning ends, said deformable projection being located closer to said terminal ends than to said beginning ends, said connection surfaces being substantially smooth except for said deformable projection.

7. The floor construction of claim 1 wherein said grooves extend inwardly beneath said bases from both said opposite edges and said sidewalls.

8. The floor construction of claim 7 wherein said grooves open outwardly below said base edges and curve upwardly to terminate at terminal groove ends located inwardly of said sidewalls.

9. The floor construction of claim 8 wherein said connectors include abutment means for abutting said outer surfaces of said sidewalls adjacent said grooves.

10. The floor construction of claim 9 wherein said sidewalls slope inwardly toward one another from said opposite base edges.

11. The floor construction of claim 1 wherein said sidewalls slope inwardly toward one another from said opposite base edges.

12. A locking and spacing connector member for connecting structural members in spaced-apart relationship, said connector member having spaced-apart outwardly facing lower abutment surfaces and upper spaced-apart curved legs extending outwardly beyond said lower abutment surfaces, said curved legs being curved outwardly and upwardly to have upper concave surfaces and lower convex surfaces, said curved legs having a substantially uniform thickness throughout their length, said connector having a longitudinal axis and extending substantially straight and uncurved from one longitudinal end thereof to the other.

13. The connector of claim 12 wherein said legs have upper and lower walls lying on the peripheries of circles having different radii and a common center.

14. The connector of claim 12 wherein said member has a downwardly curved upper surface between said upper legs.

15. A method of making a slatted flooring construction comprising the steps of:
   a. providing a plurality of U-shaped channels each channel including a base defining a load carrying surface, a pair of sidewalls extending downwardly from the edges of said base, and interlocking grooves defined by inner and outer spaced walls at each outer juncture of a sidewall with said base;
   b. placing a U-shaped channel in an inverted position on a supporting surface;
   c. providing a plurality of connectors each having a pair of upper legs and a pair of lower legs, said upper legs having ends similar in configuration to said channel grooves, said lower legs having ends terminating in a general flat surface;
   d. placing one of the upper arcuate ends of at least one connector in one of said grooves;
   e. holding a second channel in inverted relationship to the first channel;
   f. laterally moving said second channel to engage the free upper arcuate ends of said connector with a groove in the second channel;
   g. rotating the second channel into an upright position whereby said upper ends of the connector are seated in said grooves, said lower ends of the connector contact said sidewalls and the lower end of said legs rest on said supporting surface.

* * * * *

UNITED STATES PATENT OFFICE
CERTIFICATE OF CORRECTION

Patent No. 3,757,743                    Dated September 11, 1973

Inventor(s) Russell B. Lehe

It is certified that error appears in the above-identified patent and that said Letters Patent are hereby corrected as shown below:

The name of the Assignee is spelled incorrectly.

The name should be Norandex, Inc., instead of Morandex, Inc.

Signed and sealed this 5th day of February 1974.

(SEAL)
Attest:

EDWARD M. FLETCHER, JR.                RENE D. TEGTMEYER
Attesting Officer                      Acting Commissioner of Patents

UNITED STATES PATENT OFFICE
CERTIFICATE OF CORRECTION

Patent No. 3,757,743          Dated 12-1-75

Inventor(s) Russell B. Lehe and Richard L. Torbett

It is certified that error appears in the above-identified patent and that said Letters Patent are hereby corrected as shown below:

Inventors:   Russell B. Lehe, Park Ridge, Illinois

Richard L. Torbett, Akron, Ohio

Signed and Sealed this

Twenty-third Day of November 1976

[SEAL]

Attest:

RUTH C. MASON  
*Attesting Officer*

C. MARSHALL DANN  
*Commissioner of Patents and Trademarks*